US012089042B2

United States Patent
Rule

(10) Patent No.: US 12,089,042 B2
(45) Date of Patent: *Sep. 10, 2024

(54) SYSTEMS AND METHODS FOR AIRCRAFT COMMUNICATION WITH OFF-BOARD SYSTEMS

(71) Applicant: THE BOEING COMPANY, Chicago, IL (US)

(72) Inventor: Ryan Rule, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 232 days.

This patent is subject to a terminal disclaimer.

(21) Appl. No.: 17/335,984

(22) Filed: Jun. 1, 2021

(65) Prior Publication Data

US 2021/0289357 A1 Sep. 16, 2021

Related U.S. Application Data

(63) Continuation of application No. 16/178,399, filed on Nov. 1, 2018, now Pat. No. 11,026,089.

(51) Int. Cl.
*H04W 12/08* (2021.01)
*G08G 5/00* (2006.01)
(Continued)

(52) U.S. Cl.
CPC .......... *H04W 12/08* (2013.01); *G08G 5/0026* (2013.01); *H04L 63/0281* (2013.01);
(Continued)

(58) Field of Classification Search
CPC .... H04W 12/08; H04W 84/06; G08G 5/0026; H04L 63/0281; H04L 63/10; H04L 63/20; H04L 67/12; H04L 67/28; H04B 7/18506
(Continued)

(56) References Cited

U.S. PATENT DOCUMENTS 6,757,712 B1 * 6/2004 Bastian .............. B64D 11/0015
  709/203
8,233,425 B2 * 7/2012 Lynch .................. H04N 21/238
  370/316
(Continued)

FOREIGN PATENT DOCUMENTS

JP      200111624 A      4/2001
JP      2001111624 A  *  4/2001

OTHER PUBLICATIONS

"TLS Termination Proxy", Wikipedia. Retrieved from https://en.wikipedia.org/wiki/TLS_termination_proxy, Page was last edited on Aug. 17, 2018, at 22:20 (UTC), Printed on Oct. 31, 2018, 2 pgs.
(Continued)

*Primary Examiner* — Badri Narayana Champakesan
(74) *Attorney, Agent, or Firm* — Moore IP Law

(57) ABSTRACT

A system for aircraft communication includes an on-board computing device. The on-board computing device includes a first network interface, a second network interface, a third network interface, and a processor. The first network interface is configured to communicate via a wireless access point with a portable computing device. The second network interface is configured to communicate with a flight deck information network. The third network interface is configured to communicate via an off-board network with an off-board server. The processor is configured to route first data from the second network interface to the portable computing device via the first network interface. The first data includes aircraft flight information. The processor is also configured to, concurrently with routing the first data, route second data from the off-board server via the third network interface to the portable computing device via the first network interface.

22 Claims, 5 Drawing Sheets

(51) Int. Cl.
 *H04L 9/40* (2022.01)
 *H04L 29/06* (2006.01)
 *H04L 29/08* (2006.01)
 *H04L 67/12* (2022.01)
 *H04L 67/56* (2022.01)

(52) U.S. Cl.
 CPC .............. *H04L 63/10* (2013.01); *H04L 63/20* (2013.01); *H04L 67/12* (2013.01); *H04L 67/56* (2022.05)

(58) Field of Classification Search
 USPC ............................................................ 726/1
 See application file for complete search history.

(56) References Cited

U.S. PATENT DOCUMENTS

| | | | | |
|---|---|---|---|---|
| 10,181,267 | B2* | 1/2019 | Karunakar | G08G 5/0013 |
| 2005/0203676 | A1* | 9/2005 | Sandell | G08G 5/0021 |
| | | | | 701/3 |
| 2007/0264953 | A1* | 11/2007 | Srinivasan | H04L 67/325 |
| | | | | 455/186.1 |
| 2008/0004040 | A1* | 1/2008 | Bogart | H04W 48/02 |
| | | | | 455/456.1 |
| 2010/0121662 | A1* | 5/2010 | Becker | G06Q 10/02 |
| | | | | 705/5 |
| 2013/0261847 | A1* | 10/2013 | Myers | G08G 5/0021 |
| | | | | 701/3 |
| 2014/0330454 | A1* | 11/2014 | Purpura | G08G 5/065 |
| | | | | 701/3 |
| 2016/0275801 | A1* | 9/2016 | Kopardekar | G08G 5/0069 |
| 2017/0164379 | A1* | 6/2017 | Karlsson | H04L 47/20 |
| 2017/0245298 | A1* | 8/2017 | Demange | H04L 47/20 |
| 2017/0250750 | A1* | 8/2017 | Franchi | H04B 7/18506 |
| 2018/0007137 | A1* | 1/2018 | Watson | H04L 63/1425 |
| 2018/0020042 | A1* | 1/2018 | Couleaud | H04L 67/10 |
| 2018/0026706 | A1* | 1/2018 | Scacchi | G08G 5/0021 |
| | | | | 701/3 |
| 2018/0054418 | A1* | 2/2018 | El Defrawy | H04L 63/0245 |
| 2019/0014371 | A1* | 1/2019 | Couleaud | H04N 21/2146 |
| 2019/0152619 | A1* | 5/2019 | Mohan | B64D 43/00 |
| 2019/0208388 | A1* | 7/2019 | Oldewurtel | H04L 69/04 |
| 2019/0356713 | A1* | 11/2019 | Demange | H04L 65/605 |

OTHER PUBLICATIONS

Communication pursuant to Article 94(3) EPC dated Nov. 4, 2020 issued in corresponding Application No. EP19206243.8, pp. 1-6.
Extended European Search Report dated Mar. 2, 2020 issued in corresponding Application No. EP19206243, 9 pgs.
Communication pursuant to Article 94(3) EPC dated Oct. 15, 2021 issued in corresponding EP Application No. 19206243.8, pp. 1-5.
Notice of Reasons for Rejection issued by the Japanese Patent Office for application No. 2019-198397, Nov. 8, 2023, pp. 1-3.

* cited by examiner

SYSTEMS AND METHODS FOR AIRCRAFT COMMUNICATION WITH OFF-BOARD SYSTEMS

CROSS-REFERENCE TO RELATED APPLICATIONS

The present application claims priority from and is a continuation of pending U.S. patent application Ser. No. 16/178,399 entitled "SYSTEMS AND METHODS FOR AIRCRAFT COMMUNICATION WITH OFF-BOARD SYSTEMS," filed Nov. 1, 2018, the contents of which are incorporated by reference in their entirety.

FIELD OF THE DISCLOSURE

The present disclosure is generally related to systems and methods for aircraft communication with off-board systems.

BACKGROUND

Aircraft typically have multiple separate communication domains. For example, flight deck information data could be critical to the operation of the aircraft and is communicated via a first communication link to an off-board network. Other non-critical data, such as passenger data, is communicated via a second communication link that is separate from the first communication link to the off-board network. As more flight tasks move to portable devices, it would improve user experience for a pilot to be able to access the flight deck information data and other non-critical data using the same portable device. However, unrestricted access to data from off-board servers at the portable computing device while the portable computing device has access to the flight deck information data could be against security policies for the aircraft operator.

SUMMARY

In a particular implementation, a system for aircraft communication includes an on-board computing device. The on-board computing device includes a first network interface, a second network interface, a third network interface, and a processor. The first network interface is configured to communicate via a wireless access point with a portable computing device. The second network interface is configured to communicate with a flight deck information network. The third network interface is configured to communicate via an off-board network with an off-board server. The processor is configured to route first data from the second network interface to the portable computing device via the first network interface. The first data includes aircraft flight information. The processor is also configured to, concurrently with routing the first data, route second data from the off-board server via the third network interface to the portable computing device via the first network interface.

In another particular implementation, an aircraft includes a wireless access point and a network file server (NFS) coupled to the wireless access point. The wireless access point is configured to communicate with a portable computing device. The NFS is configured to route first data from a flight deck information network to the portable computing device via the wireless access point. The first data includes aircraft flight information. The NFS is also configured to, concurrently with routing the first data, route second data from an off-board server via the wireless access point to the portable computing device.

In another particular implementation, a method of aircraft communication includes routing, at an on-board computing device, first data from a flight deck information network to a portable computing device via a wireless access point. The first data includes aircraft flight information. The method also includes, concurrently with routing the first data, routing, at the on-board computing device, second data from an off-board server via the wireless access point to the portable computing device.

In another particular implementation, a computer-readable storage device stores instructions that, when executed by a processor, cause the processor to perform operations including routing first data from a flight deck information network to a portable computing device via a wireless access point. The first data includes aircraft flight information. The operations also include, concurrently with routing the first data, routing second data from an off-board server via the wireless access point to the portable computing device.

The features, functions, and advantages described herein can be achieved independently in various implementations or may be combined in yet other implementations, further details of which can be found with reference to the following description and drawings.

DETAILED DESCRIPTION

Figure 1:
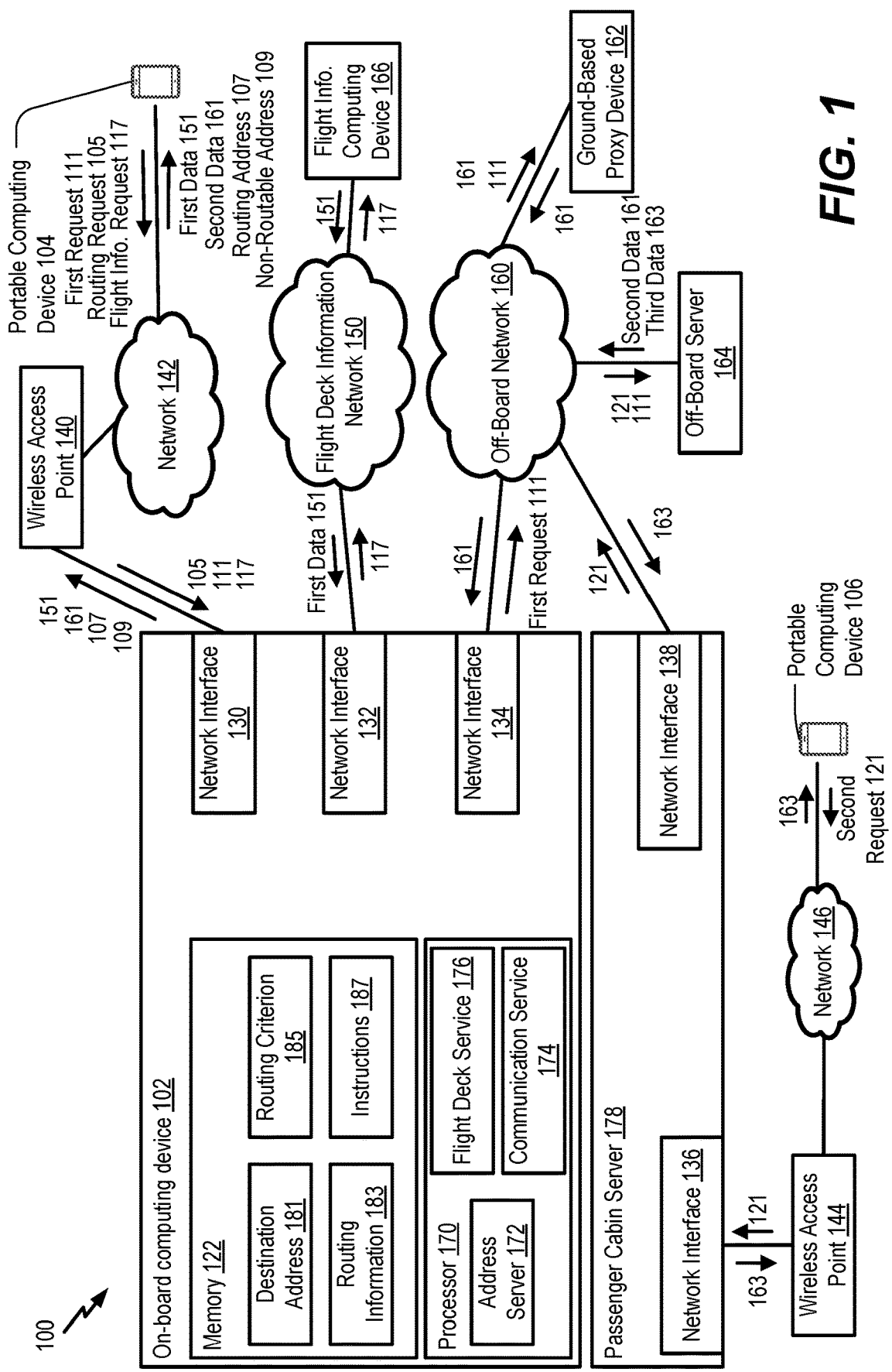
FIG. 1 is a block diagram that illustrates a system for aircraft communication with off-board systems.

Implementations described herein are directed to systems and methods for aircraft communication with off-board systems. An aircraft includes an on-board computing device that is configured to communicate with a portable computing device. The portable computing device could be used by a pilot of the aircraft (e.g., as an electronic flight bag device). The on-board computing device is also configured to receive flight information data from a flight information computing device. The on-board computing device is configured to communicate, via an off-board network, with a ground-based proxy device. The ground-based proxy device has access to security policies (e.g., a white list or a black list) that indicate whether communication with particular ground servers is authorized while the portable computing device has access to aircraft flight information. To illustrate, the security policies indicate that communication with a first ground server is authorized, communication with a second ground server is not authorized, or both.

A flight deck service of the on-board computing device receives first data from the flight information computing device and forwards the first data to the portable computing device. For example, the first data indicates aircraft flight information that the pilot is monitoring.

The portable computing device sends a request to a communication service of the on-board computing device. For example, the request is sent responsive to a user input indicating that the pilot requests data from a ground server, such as a third-party server, an e-mail server, a weather application server, a webserver, a publicly accessible server, or a combination thereof. To illustrate, the pilot activates an aviation application on the portable computing device and the aviation application sends the request to the communication service for data from a ground server associated with the aviation application. The communication service establishes a secured network connection with the ground-based proxy device and uses the secured network connection to send the request, via the off-board network, to the ground-based proxy device.

The ground-based proxy device forwards the request to the ground server in response to determining that the security policies indicate that communication with the ground server is authorized. The ground-based proxy device receives second data from the ground server. In a particular example, the ground-based proxy device determines, based on the security policies, whether the second data is to be routed to the aircraft. To illustrate, the ground-based proxy device determines that the second data is to be routed to the aircraft in response to determining that that the second data satisfies an anti-virus check. The ground-based proxy device uses the secured network connection to send the second data to the communication service of the aircraft. The communication service provides the second data to the portable computing device.

The on-board computing device thus, concurrently with routing the first data to the portable computing device, routes the second data to the portable computing device. The second data is routed to the portable computing device if the security policies of the ground-based proxy device indicate that communication with the off-board server is authorized. Having the ground-based proxy device determine whether the security policies are satisfied keeps intensive data processing tasks off the aircraft and at the ground-based proxy device. Determining whether the second data satisfies the security policies at the ground-based proxy device, as compared to on the aircraft, also ensures that the data that does not satisfy the security policies is kept off the aircraft. Refraining from sending data to the aircraft that fails to satisfy the security policies conserves communication resources (e.g., bandwidth and time). Data from off-board servers can thus be selectively provided to the portable computing device while the portable computing device has access to the aircraft flight information.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, a system 100 for aircraft communication with off-board systems is shown. The system 100 includes an on-board computing device 102, a passenger cabin server 178, or both. The on-board computing device 102 includes a processor 170, a memory 122, a network interface 130, a network interface 132, a network interface 134, or a combination thereof. In a particular aspect, the on-board computing device 102 includes or corresponds to a network file server (NFS).

The network interface 130 is configured to be coupled to a wireless access point 140. The wireless access point 140 is configured to communicate, via a network 142, with a portable computing device 104. The portable computing device 104 includes, for example, a mobile device, a communication device, a computing device, a personal digital assistant, or any combination thereof. The network 142 includes a wired network, a wireless network, or both. In a particular aspect, an aircraft includes the on-board computing device 102, a coverage area of the network 142 includes a cockpit of the aircraft, and the portable computing device 104 is configured to be used by a pilot of the aircraft. For example, the portable computing device 104 can include an electronic flight bag application.

The network interface 132 is configured to communicate, via a flight deck information network 150, with a flight information computing device 166. A flight information computing device 166 can be connected to an aircraft sensor, for example, a temperature sensor, an inertial measurement unit (IMU), a gyroscope, an accelerometer, a magnetometer, a fuel gauge, a pressure sensor, a force sensor, a torque sensor, a speed sensor, a global positioning system (GPS) receiver, a flow sensor, a proximity sensor, a radar sensor, an angle-of-attack sensor, a smoke detection sensor, an altimeter sensor, or any combination thereof. Additionally, or in the alternative, the flight information computing device 166 can be connected to a flight control computer or line replaceable unit (LRU) to access flight information.

The network interface 134 is configured to communicate, via an off-board network 160, with a ground-based proxy device 162, an off-board server 164, or a combination thereof. The ground-based proxy device 162 has access to security policies. For example, the ground-based proxy device 162 is located at a flight operations center associated with an airline or other operator of the aircraft, and the security policies are based on configuration data, operator policies, default data, user input, or a combination thereof. The security policies (e.g., a white list or a black list) indicate whether communication with particular servers is authorized for the portable computing device 104 while the portable computing device 104 has access to the flight information.

The passenger cabin server 178 includes a network interface 136, a network interface 138, or both. The passenger cabin server 178 includes or is coupled to a wireless access point 144. The wireless access point 144 is configured to communicate, via a network 146, with a portable computing device 106. The network interface 138 is configured to communicate, via the off-board network 160, with the off-board server 164. The network 146 includes a wired network, a wireless network, or both. In a particular aspect, an aircraft includes the on-board computing device 102, a coverage area of the network 146 includes a passenger cabin of the aircraft, and the portable computing device 106 is configured to be used by a passenger of the aircraft. For example, the portable computing device 106 includes a personal computer of the passenger and does not have access to the flight information computing device 166. In a particular aspect, the passenger cabin server 178 is configured to enable communication between the portable computing device 106 and the off-board server 164 independently of the ground-based proxy device 162 because the portable computing device 106 does not have access to the flight information computing device 166.

In a particular aspect, an aircraft includes the on-board computing device 102, the wireless access point 140, the network 142, the portable computing device 104, the flight deck information network 150, the flight information computing device 166, the passenger cabin server 178, the wireless access point 144, the network 146, the portable computing device 106, or any combination thereof. In a particular aspect, the off-board server 164, the ground-based proxy device 162, the off-board network 160, or any combination thereof, are external to the aircraft.

It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. In a particular aspect, one or more functions described herein as performed by the on-board computing device 102 are divided amongst multiple devices (e.g., the on-board computing device 102, a central server, a distributed system, or any combination thereof). Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The memory 122 includes volatile memory devices (e.g., random access memory (RAM) devices), nonvolatile memory devices (e.g., read-only memory (ROM) devices, programmable read-only memory, and flash memory), or both. In a particular aspect, the memory 122 includes one or more applications (e.g., instructions) executable by the processor 170 to initiate, control, or perform one or more operations described herein. In an illustrative example, a computer-readable storage device (e.g., the memory 122) includes instructions that, when executed by the processor 170, cause the processor 170 to initiate, perform, or control operations described herein. In a particular aspect, the memory 122 is configured to store instructions 187 that are executable by the processor 170 to perform one or more operations described herein.

The memory 122 is configured to store routing information 183. The routing information 183 (e.g., a white list or a black list) indicates whether communication with a destination address 181 is authorized while the portable computing device 104 has access to aircraft flight information. For example, the routing information 183 indicates that communication with one or more destination addresses is authorized and communication with any destination address that is not included in the one or more destination addresses is unauthorized. As another example, the routing information 183 indicates that communication with one or more destination addresses is unauthorized and communication with any destination address that is not included in the one or more destination addresses is authorized.

The processor 170 includes an address server 172, a communication service 174, a flight deck service 176, or a combination thereof. The address server 172 (e.g., a hypertext transfer protocol (HTTP) server) is configured to receive a routing request 105 from the portable computing device 104. For example, the portable computing device 104, in response to determining that a first request 111 is to be sent to the off-board server 164, sends the routing request 105 to the address server 172 to determine where to send the first request 111 for routing to the off-board server 164. The address server 172 is configured to, based on determining whether communication with the off-board server 164 (e.g., the destination address 181) is authorized, provide a non-routable address 109 or a routing address 107 of the communication service 174 to the portable computing device 104. The portable computing device 104 sends the first request 111 to the address (e.g., the non-routable address 109 or the routing address 107) provided by the address server 172. The flight deck service 176 is configured to route first data 151 from the flight information computing device 166 via the network interface 132 to the portable computing device 104 via the network interface 130.

The communication service 174 is configured to receive the first request 111 from the portable computing device 104 to communicate with the off-board server 164. The first request 111 indicates the destination address 181 of the off-board server 164. The communication service 174 is configured to establish secure communication with the ground-based proxy device 162 and forward the first request 111 to the ground-based proxy device 162. The communication service 174 is configured to receive second data 161 from the ground-based proxy device 162 and forward the second data 161 to the portable computing device 104.

During operation, a user (e.g., a pilot) uses an electronic flight bag application of the portable computing device 104 to request aircraft flight information from the flight deck service 176. For example, the portable computing device 104 sends a flight information request 117 to the flight deck service 176. The flight deck service 176 forwards the flight information request 117 to the flight information computing device 166. The flight information computing device 166 generates the first data 151. The first data 151 indicates aircraft flight information (e.g., sensor data or flight data). The flight information computing device 166, in response to receiving the flight information request 117, provides the first data 151 to the flight deck service 176. For example, the network interface 132 of the on-board computing device 102 receives the first data 151 via the flight deck information network 150 from the flight information computing device 166. The flight deck service 176 forwards the first data 151 to the portable computing device 104. For example, the flight deck service 176 sends the first data 151, via the network interface 130, to the wireless access point 140. The wireless access point 140 sends the first data 151, via the network 142, to the portable computing device 104.

The pilot uses another application (e.g., a weather application or an e-mail application) that generates the first request 111 for the off-board server 164. The portable computing device 104 generates the routing request 105 indicating the destination address 181 of the off-board server 164. The portable computing device 104 sends the routing request 105 to the address server 172 to determine where to send the first request 111 for routing to the off-board server 164. For example, the portable computing device 104 sends the routing request 105 to the address server 172 in response to determining that configuration data of the portable computing device 104 indicates that routing requests are to be sent to the address server 172. The portable computing device 104 sends the routing request 105, via the network 142, to the wireless access point 140.

The address server 172 receives the routing request 105 via the network interface 130 from the portable computing device 104. For example, the address server 172 receives the routing request 105 from the wireless access point 140. The address server 172 determines, based on the routing information 183, whether the destination address 181 satisfies a routing criterion 185. For example, the address server 172 determines that the destination address 181 fails to satisfy the routing criterion 185 in response to determining that the routing information 183 indicates that communication with the destination address 181 is unauthorized while the portable computing device 104 has access to the flight deck information network 150. The address server 172, in response to determining that the destination address 181 fails to satisfy the routing criterion 185, sends the non-routable address 109 via the first network interface 130 to the portable computing device 104. In a particular aspect, the non-routable address 109 includes an internet protocol (IP) address (e.g., 192.168.0.0, 10.0.0.0, or 172.16.0.0) that is excluded from the public address space.

The portable computing device 104, in response to receiving the non-routable address 109 from the address server 172, determines that the first request 111 is to be sent to the non-routable address 109 and sends the first request 111 for the off-board server 164 to the non-routable address 109. The portable computing device 104 receives an error message (e.g., a host not reachable message) responsive to the first request 111. For example, the wireless access point 140, in response to receiving a packet including the first request 111 and determining that a destination address field of the packet indicates the non-routable address 109, sends the error message (e.g., the host not reachable message) to the portable computing device 104. When communication with the off-board server 164 is unauthorized while the portable computing device 104 has access to the flight deck information network 150, providing the non-routable address 109 to the portable computing device 104 prevents the first request 111 from leaving the aircraft, being routed by the off-board network 160, reaching the off-board server 164, or a combination thereof, thereby conserving bandwidth.

In a particular example, the address server 172 determines that the destination address 181 satisfies the routing criterion 185 in response to determining that the routing information 183 indicates that communication with the destination address 181 is authorized (or is not unauthorized) while the portable computing device 104 has access to the flight deck information network 150. The address server 172, in response to determining that the destination address 181 satisfies the routing criterion 185, selects the routing address 107 of the communication service 174. The address server 172 sends the routing address 107 to the portable computing device 104. For example, the address server 172 sends the routing address 107 via the network interface 130 to the wireless access point 140. The wireless access point 140 sends the routing address 107 via the network 142 to the portable computing device 104.

The portable computing device 104, in response to receiving the routing address 107 from the address server 172, determines that the first request 111 is to be sent via the routing address 107 and sends the first request 111 for the off-board server 164 to the routing address 107 of the communication service 174. The communication service 174 forwards the first request 111 to the ground-based proxy device 162. For example, the communication service 174, in response to receiving the first request 111, establishes a secured network connection with the ground-based proxy device 162. To illustrate, the communication service 174 sends credentials of the on-board computing device 102 to the ground-based proxy device 162, exchanges encryption keys with the ground-based proxy device 162, or a combination thereof. The communication service 174, in response to determining that the ground-based proxy device 162 has authorized the on-board computing device 102 and that the secured network connection has been successfully established, forwards the first request 111 via the secured network connection to the ground-based proxy device 162. For example, the communication service 174 uses an encryption key associated with the network connection to encrypt the first request 111 and sends an encrypted version of the first request 111 via the off-board network 160 to the ground-based proxy device 162.

The ground-based proxy device 162, in response to receiving the first request 111, determines whether security policies indicate that communication with the off-board server 164 is authorized while the portable computing device 104 is communicating with the second network interface 132 to access the aircraft flight information. The ground-based proxy device 162, in response to determining that the security policies indicate that communication with the off-board server 164 is unauthorized, discards the first request 111, sends a first error message (e.g., an unauthorized access message) via the secured network connection to the communication service 174, or both. The communication service 174, in response to receiving the first error message from the ground-based proxy device 162, sends a second error message (e.g., a host not reachable message) to the portable computing device 104. In a particular implementation, determining whether the destination address 181 satisfies the routing criterion 185 is less computationally expensive than determining whether the first request 111 satisfies the security policies. Performing the less computationally expensive determination at the aircraft and the more computationally expensive determination at the ground-based proxy device 162 balances saving network resources of the off-board network 160 (by not refraining from routing requests that fail to satisfy the routing criterion 185) and conserving computational resources of the aircraft (by performing the more computationally expensive determining off the aircraft). In a particular aspect, having the ground-based proxy device 162 determine whether the first request 111 satisfies the security policies includes determining whether the destination address 181 satisfies the routing criterion 185. In this aspect, if the portable computing device 104 sends the first request 111 to the routing address 107 independently of whether the destination address 181 satisfies the routing criterion 185, the ground-based proxy device 162 prevents the first request 111 from being forwarded to the off-board server 164 in response to determining that the first request 111 fails to satisfy the security policies.

In a particular aspect, the ground-based proxy device 162, based on determining that the communication with the off-board server 164 is authorized, retrieves the second data 161 from the off-board server 164. For example, the ground-based proxy device 162 sends the first request 111 to the off-board server 164 in response to determining that the security policies indicate that communication with the off-board server 164 is authorized. The off-board server 164, in response to receiving the first request 111 from the ground-based proxy device 162, sends the second data 161 to the ground-based proxy device 162.

The ground-based proxy device 162, in response to receiving the second data 161, forwards the second data 161 via the secured network connection to the communication service 174. For example, the ground-based proxy device 162 generates encrypted data by encrypting the second data 161 using an encryption key associated with the secured network connection.

The communication service 174 receives the encrypted data via the secured network connection, extracts the second data 161 from the encrypted data, and routes the second data 161 to the portable computing device 104. For example, the communication service 174 forwards the second data 161 received from the ground-based proxy device 162 via the network interface 134 to the portable computing device 104 via the network interface 130. The portable computing device 104 thus, concurrently with routing the first data 151 (e.g., aircraft flight information) received from flight information computing device 166 via the network interface 132 to the portable computing device 104 via the network interface 130, routes the second data 161 received from the off-board server 164 via the network interface 134 to the portable computing device 104 via the network interface 130.

In some aspect, the portable computing device 104 is unaware of the use of the network connection and the ground-based proxy device 162 to enable communication with the off-board server 164. For example, there may be few, if any, changes to an application on the portable computing device 104 to enable communication via the ground-based proxy device 162 (as compared to directly) with the off-board server 164.

In a particular aspect, the passenger cabin server 178 receives a second request 121 via the network interface 136 from the portable computing device 106. For example, the portable computing device 106 generates the second request 121 in response to activation of an application (e.g., a weather application or an e-mail application) at the portable computing device 106, receiving user input from a user (e.g., a passenger), or both. The portable computing device 106 determines that the second request 121 is to be sent to the off-board server 164. In a particular aspect, the off-board server 164 is associated with the application, indicated by the user input, or both. The portable computing device 106 can send the second request 121 via the network 146 to the wireless access point 144. The passenger cabin server 178 receives the second request 121 from the wireless access point 144 via the network interface 136 and forwards the second request 121 to the off-board server 164 via the network interface 138.

The off-board server 164, in response to receiving the second request 121, sends third data 163, via the off-board network 160, to the passenger cabin server 178. The passenger cabin server 178 is configured to route the third data 163 from the off-board server 164 via the wireless access point 144 to the portable computing device 106. For example, the passenger cabin server 178 receives the third data 163 from the off-board server 164 via the network interface 138 and forwards the third data 163 to the portable computing device 106 via the network interface 136. The third data 163 received from the off-board server 164 is routed to the portable computing device 106 via the wireless access point 144 that is distinct from the wireless access point 140 that is used to route the first data 151 (e.g., aircraft flight information) to the portable computing device 104.

The system 100 thus enables routing the second data 161 (received from the off-board server 164 via the network connection established by the communication service 174) to the portable computing device 104 via the wireless access point 140 that is used to concurrently route the first data 151 (received from the flight information computing device 166 via the flight deck information network 150) to the portable computing device 104. A user (e.g., the pilot) can thus use the same portable computing device 104 to access the aircraft flight information received from the flight information computing device 166 and the second data 161 received from the off-board server 164.

Figure 2:
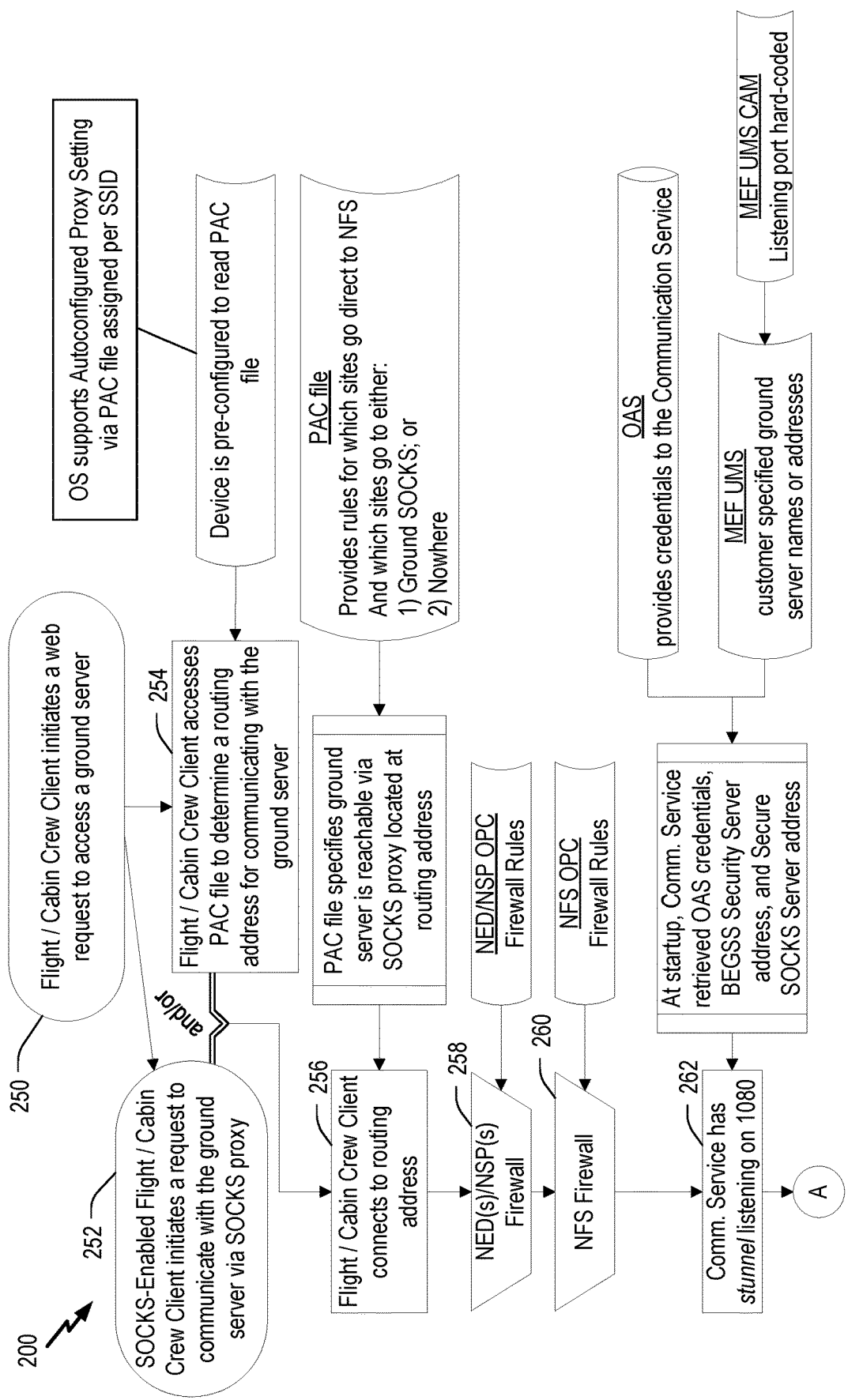
FIG. 2 is a diagram that illustrates aspects of an example of aircraft communication performed by the system of FIG. 1.
Figure 3:
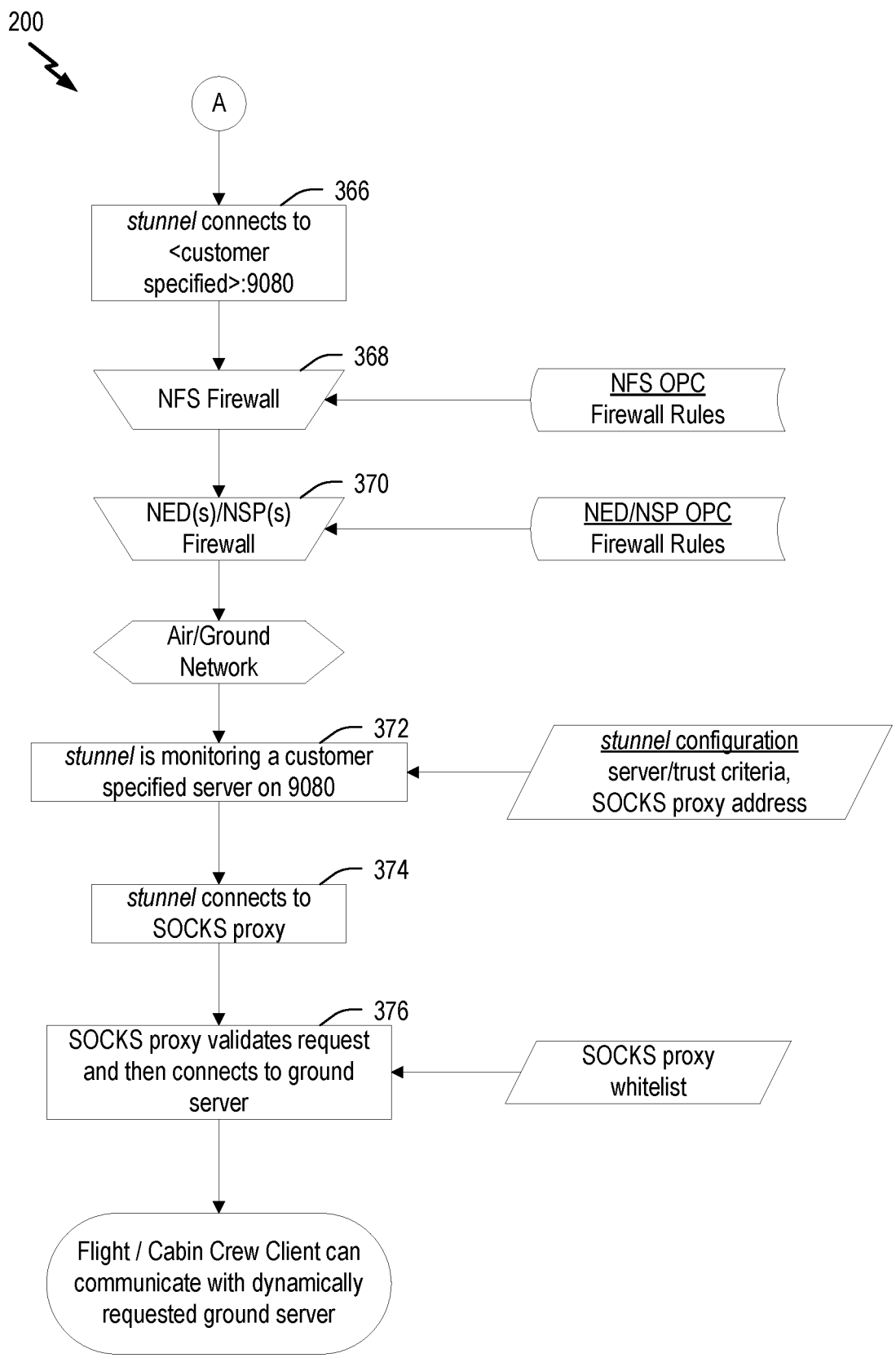
FIG. 3 is a diagram that illustrates further aspects of an example of aircraft communication performed by the system of FIG. 1.

Referring to FIGS. 2-3, an example 200 of aircraft communication performed by the system 100 of FIG. 1 is shown. One or more operations described with reference to the example 200 are performed by the address server 172, the communication service 174, the flight deck service 176, the processor 170, the on-board computing device 102, or a combination thereof.

In the example 200, flight/cabin crew client initiates a web request to access a ground server, at 250. For example, a flight/cabin crew application (e.g., an e-mail client or a web client) of the portable computing device 104 of FIG. 1 receives a user input from a user (e.g., a pilot or a cabin crew member) indicating a request to communicate with the off-board server 164. The flight/cabin crew application, in response to receiving the user input, initiates a web request to access the off-board server 164.

Flight/cabin crew client accesses proxy auto-config (PAC) file to determine a routing address for communicating with the ground server, at 254. In a particular example, an operating system (OS) of the portable computing device 104 supports auto-configured proxy setting via a configuration file (e.g., a PAC file) assigned per wireless network. For example, a particular configuration file (e.g., "proxy.pac") is assigned to a particular service set identifier (SSID) that uniquely identifies a wireless local-area network (LAN). The portable computing device 104 is pre-configured to access the particular configuration file (e.g., "proxy.pac"). In a particular aspect, the particular configuration file is stored in a memory of the portable computing device 104, the memory 122 of the on-board computing device 102, or both. The portable computing device 104 determines that the particular configuration file (e.g., "proxy.pac") indicates that the destination address 181 of the off-board server 164 maps to the routing address 107 (e.g., "osslop\commserv.ons.pnet: 1080") of the communication service 174.

Alternatively, or in addition, a SOCKS-enabled flight/cabin crew client initiates a request to communicate with the ground server via a SOCKS proxy, at 252. For example, the flight/cabin crew application (e.g., an e-mail client or a web client) of the portable computing device 104 is SOCKS-enabled. SOCKS refers to an internet protocol for exchanging network packets between a client and a server through a proxy server. The flight/cabin crew application (e.g., an e-mail client or a web client) of the portable computing device 104 sends the routing request 105 to the address server 172 to request communication with the off-board server 164 via a proxy (e.g., the ground-based proxy device 162). In a particular aspect, the ground-based proxy device 162 includes a SOCKS proxy server. The address server 172, in response to receiving the routing request 105, sends the routing address 107 (e.g., "osslop\commserv.ons.pnet: 1080") of the communication service 174 to the portable computing device 104, as described with reference to FIG. 1.

The flight/cabin crew client connects to the routing address, at 256. The particular configuration file (e.g., "proxy.pac") includes the routing information 183 of FIG. 1 indicating a mapping between sites and addresses. For example, the routing information 183 indicates a first set of addresses (e.g., one or more of an IP address, a universal resource locator (URL), or a universal resource identifier (URI)) that map to the ground-based proxy device 162, a second set of addresses (e.g., one or more of an IP address, a URL, or a URI) that are not routable, or both. Communication with devices associated with the first set of addresses is authorized while having access to aircraft flight information. Communication with devices associated with the second set of addresses is unauthorized while having access to the aircraft flight information. The routing information 183 indicates that the off-board server 164 is reachable via the communication service 174. The routing information 183 indicates the routing address 107 (e.g., "osslop\commserv.ons.pnet:1080") of the communication service 174. The portable computing device 104 sends the first request 111 for the off-board server 164 to the routing address 107 (e.g., "osslop\commserv.ons.pnet:1080").

The communication service 174 determines whether network extension device (NED)/NED subsystem processor (NSP) firewall rules are satisfied, at 258. For example, the communication service 174 determines whether the first request 111 satisfies first firewall rules. The communication service 174, in response to determining that the first request 111 fails to satisfy first firewall rules, discards the first request 111, sends an error message (e.g., a host unreachable message) to the portable computing device 104, or both. The first firewall rules include one or more NED firewall rules, one or more NSP firewall rules, or a combination thereof. In a particular aspect, a NED includes an on-board router, a collector of aircraft data, or both. For example, the NED includes an Ethernet switch, a router, or both. In a particular aspect, the NED complies with the aeronautical radio inc. (ARINC®, a registered trademark of ARINC Inc., Annapolis, MD) 429 technical standard. For example, the NED has ARINC 429 input/output capability. In a particular aspect, the NSP includes an on-board router, a collector of aircraft data, or both. For example, the NSP includes an Ethernet switch, a router, or both. In a particular aspect, the NSP complies with the ARINC® 429 technical standard. In a particular aspect, the NSP is built into the same hardware components as the NFS.

The communication service 174, in response to determining that the first request 111 satisfies the NED/NSP firewall rules, at 258, determines whether NFS firewall rules are satisfied, at 260. For example, the communication service 174 determines whether the first request 111 satisfies NFS firewall rules. The communication service 174, in response to determining that the first request 111 fails to satisfy NFS firewall rules, discards the first request 111, sends an error message (e.g., a host unreachable message) to the portable computing device 104, or both.

The communication service 174 has a stunnel listening on port 1080. For example, the communication service 174, at startup of the communication service 174, the portable computing device 104, or both, retrieves credentials of the portable computing device 104, configuration data, or both, from the memory 122 of FIG. 1. The configuration data indicates a security server address, a SOCKS server address, or both. The configuration data includes user-specified identifiers of ground servers for which communication is authorized while having access to aircraft flight information. For example, the user-specified identifiers include a name of the off-board server 164, the destination address 181 of the off-board server 164, or both. In a particular aspect, the configuration data indicates a particular port (e.g., a listening port). The communication service 174 monitors the particular port (e.g., 1080).

Continuing at FIG. 3, stunnel connects to <customer specified>:9080, at 366. For example, the communication service 174, in response to receiving the first request 111 from the portable computing device 104, establishes a session with a port (e.g., 9080) of the ground-based proxy device 162.

The communication service 174 determines whether NFS firewall rules are satisfied, at 368. For example, the communication service 174 generates a forwarding request including the first request 111 and determines whether the forwarding request satisfies the NFS firewall rules. The communication service 174, in response to determining that the forwarding request fails to satisfy the NFS firewall rules, discards the forwarding request, discards the first request 111, sends an error message (e.g., a host unreachable message) to the portable computing device 104, or a combination thereof.

The communication service 174, in response to determining that the forwarding request satisfies the NFS firewall rules, at 368, determines whether the forwarding request satisfies one or more NED firewall rules, one or more NSP firewall rules, or a combination thereof. The communication service 174, in response to determining that the forwarding request fails to satisfy at least one of the NED firewall rules or the NSP firewall rules, discards the forwarding request, discards the first request 111, sends an error message (e.g., a host unreachable message) to the portable computing device 104, or a combination thereof.

The communication service 174, in response to determining that the forwarding request satisfies the NED firewall rules, the NSP firewall rules, or a combination thereof, at 368, monitors a customer specified server on port 9080, at 372. For example, the communication service 174 monitors the session established with the ground-based proxy device 162.

The communication service 174 connects to a SOCKS proxy, at 374. For example, the communication service 174 establishes a secured network connection with the SOCKS proxy server of the ground-based proxy device 162.

The SOCKS proxy validates the request and then connects to the ground server, at 376. The communication service 174 sends the forwarding request via the secured network connection to the ground-based proxy device 162. The forwarding request indicates that the first request 111 is to be forwarded to the off-board server 164. The ground-based proxy device 162 validates the forwarding request based on security policies (e.g., a SOCKS proxy whitelist). For example, the ground-based proxy device 162, in response to determining that the security policies (e.g., a SOCKS proxy whitelist) indicate that communication with the off-board server 164 is authorized, sends the first request 111 to the off-board server 164.

The portable computing device 104 communicates via the ground-based proxy device 162 with the off-board server 164. For example, the off-board server 164 sends the second data 161 via the ground-based proxy device 162 to the portable computing device 104, as described with reference to FIG. 1.

The communication service 174 thus enables routing the second data 161 received from the off-board server 164 via the network connection established by the communication service 174 to the portable computing device 104. The second data 161 is routed to the portable computing device 104 in response to determining that communication with the off-board server 164 is authorized.

Figure 4:
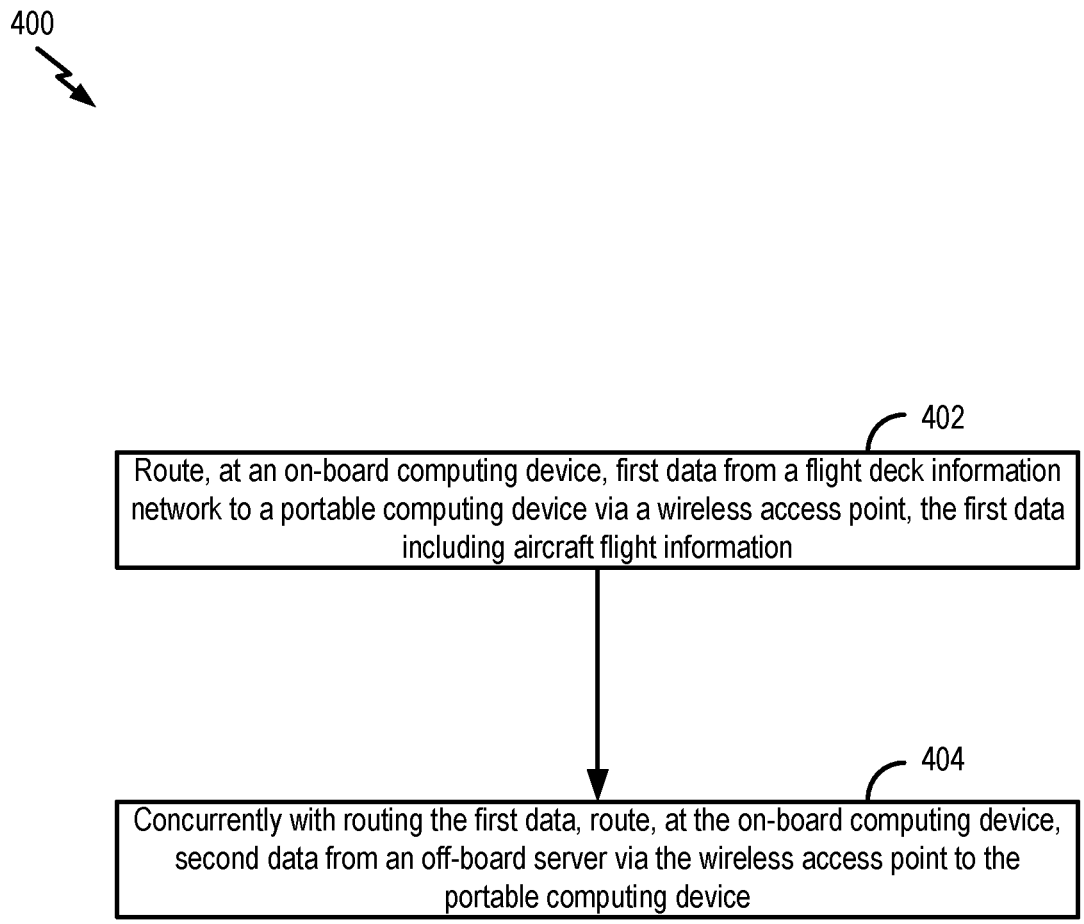
FIG. 4 is a flow chart of an example of a method of aircraft communication with off-board systems.

FIG. 4 is a flowchart of a method 400 for aircraft communication with off-board systems. The method 400 may be performed by the processor 170, the address server 172, the communication service 174, the flight deck service 176, the on-board computing device 102, the system 100 of FIG. 1, or any combination thereof.

The method 400 includes routing, at an on-board computing device, first data from a flight deck information network to a portable computing device via a wireless access point, at 402. For example, the on-board computing device 102 of FIG. 1 routes the first data 151 from the flight deck information network 150 to the portable computing device 104 via the wireless access point 140, as described with reference to FIG. 1. The first data 151 includes aircraft flight information.

The method 400 also includes concurrently with routing the first data, routing, at the on-board computing device, second data from an off-board server via the wireless access point to the portable computing device, at 404. For example, the on-board computing device 102, concurrently with routing the first data 151, routes the second data 161 from the off-board server 164 via the wireless access point 140 to the portable computing device 104, as described with reference to FIG. 1.

The method 400 thus enables routing the second data 161 (received from the off-board server 164) to the portable computing device 104 via the wireless access point 140 that is used to concurrently route the first data 151 (received via the flight deck information network 150) to the portable computing device 104. A user (e.g., the pilot) can thus use the same portable computing device 104 to access the aircraft flight information received via the flight deck information network 150 and the second data 161 received from the off-board server 164.

Figure 5:
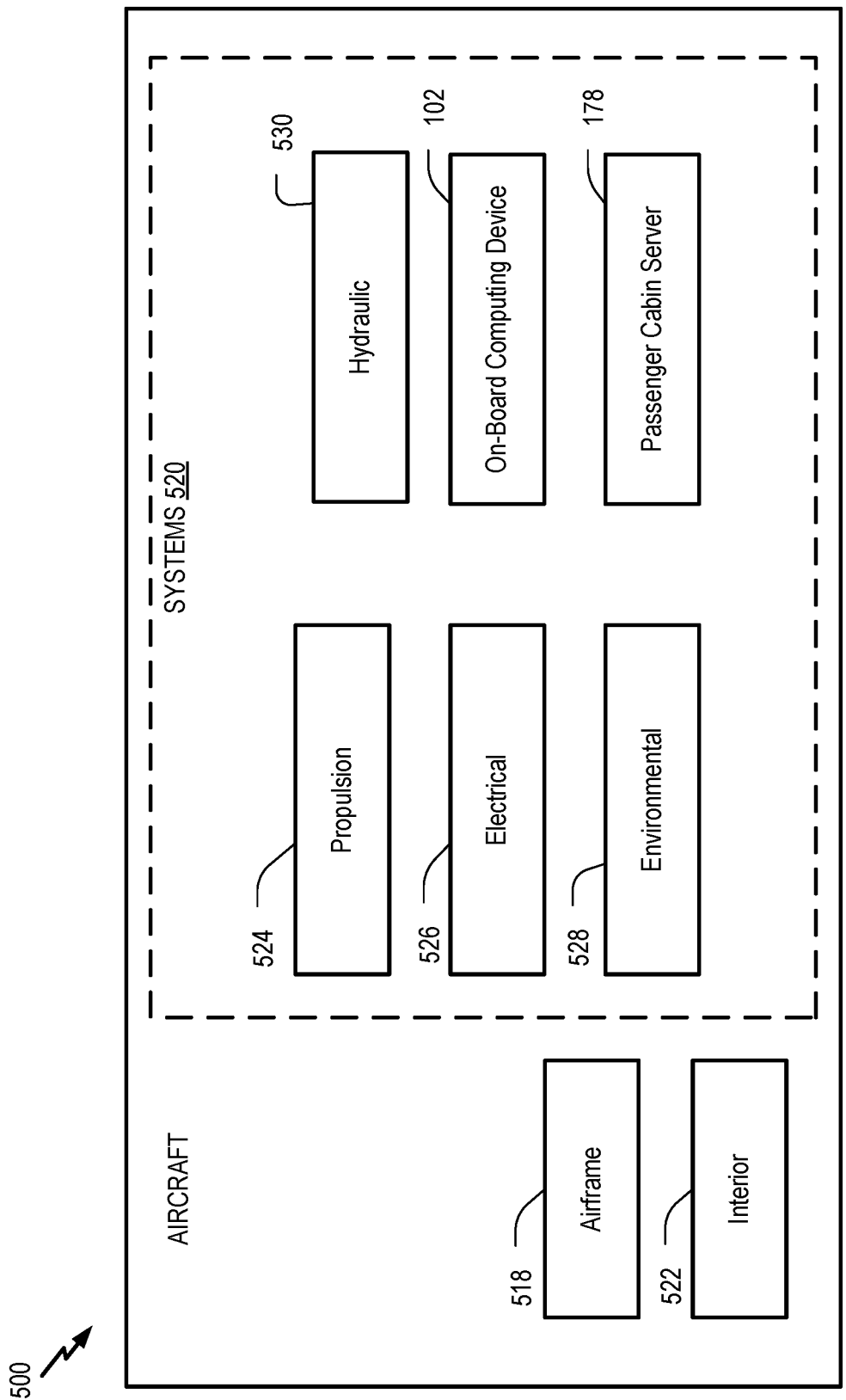
FIG. 5 is a block diagram of an aircraft configured to support aspects of computer-implemented methods and computer-executable program instructions (or code) according to the present disclosure.

Aspects of the disclosure may be described in the context of an aircraft 500 as shown in FIG. 5. The aircraft 500 includes an airframe 518 with a plurality of systems 520 (e.g., high-level systems) and an interior 522. Examples of the systems 520 include one or more of a propulsion system 524, an electrical system 526, an environmental system 528, an hydraulic system 530, the on-board computing device 102, and the passenger cabin server 178. Other systems can also be included.

The on-board computing device 102, the passenger cabin server 178, or both, are configured to support aspects of computer-implemented methods and computer-executable program instructions (or code) according to the present disclosure. For example, the on-board computing device 102, the passenger cabin server 178, or portions thereof, are configured to execute instructions to initiate, perform, or control one or more operations described with reference to FIGS. 1-4. Although an aerospace example is shown, the present disclosure can be applied to other industries. For example, the on-board computing device 102, the passenger cabin server 178, or both, can be used onboard a manned or unmanned vehicle (such as a satellite, a watercraft, or a land-based vehicle), in a building or other structure.

Although one or more of FIGS. 1-5 illustrate systems, apparatuses, and/or methods according to the teachings of the disclosure, the disclosure is not limited to these illustrated systems, apparatuses, and/or methods. One or more functions or components of any of FIGS. 1-5 as illustrated or described herein may be combined with one or more other portions of another of FIGS. 1-5. For example, one or more elements of the method 400 of FIG. 4 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-4 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system for aircraft communication comprising:
   an on-board computing device of an aircraft, the on-board computing device including:
      a first network interface configured to communicate via a wireless access point with a portable computing device with access to a flight information computing device of the aircraft, the portable computing device associated with a pilot or cabin crew member of the aircraft, wherein the flight information computing device generates aircraft flight information associated with the aircraft;

a second network interface configured to communicate with the flight information computing device via a flight deck information network;

a third network interface to accommodate communication between the portable computing device and one or more off-board servers, wherein the third network interface is configured to communicate via an off-board network with the one or more off-board servers via a ground-based proxy device; and a processor configured to:
route first data from the second network interface to the portable computing device via the first network interface, the first data including at least a portion of the aircraft flight information;

receive, via the first network interface from the portable computing device, a first request to communicate with a first server of the one or more off-board servers;

send, to the ground-based proxy device, the first request via the third network interface and the off-board network, wherein the ground-based proxy device is configured to access security policies to make an authorization determination of whether communication with the first server is allowed;

in response to the authorization determination indicating that the communication with the first server is allowed, receive second data from the first server via the third network interface; and concurrently with routing the first data, route the second data to the portable computing device via the first network interface.

2. The system of claim 1, wherein the on-board computing device is coupled to a memory, wherein the memory is configured to store routing information, and wherein the processor is configured to:
receive, via the first network interface from the portable computing device, a routing request indicating a destination address of the routing request; and
determine, based on the routing information, whether communication with the destination address is authorized for the portable computing device.

3. The system of claim 2, wherein the processor is further configured to:
select a routing address based on determining that communication with the destination address is authorized for the portable computing device; and
send the routing address via the first network interface to the portable computing device.

4. The system of claim 2, wherein the processor is further configured to, based on determining that communication with the destination address is unauthorized for the portable computing device, send a non-routable address via the first network interface to the portable computing device.

5. The system of claim 1, wherein, in response to the authorization determination indicating that the communication with the first server is allowed, the ground-based proxy device is configured to:
retrieve the second data from the first server; and
send the second data to the on-board computing device.

6. The system of claim 5, wherein the on-board computing device is configured to:
establish a secured network connection via the third network interface with the ground-based proxy device;
receive encrypted data via the secured network connection; and prior to routing the second data to the portable computing device, extract the second data from the encrypted data.

7. An aircraft comprising:
a flight information computing device configured to generate aircraft flight information;
a wireless access point configured to communicate with a portable computing device with access to the flight information computing device, the portable computing device associated with a pilot or cabin crew member of the aircraft;
a network file server (NFS) coupled via a first network interface to the wireless access point, the NFS configured to:
route first data received via a second network interface from a flight deck information network to the portable computing device via the first network interface, the first data including at least a portion of the aircraft flight information;

receive, via the first network interface from the portable computing device, a first request to communicate with a first server of one or more off-board servers;

send, to a ground-based proxy device, the first request via a third network interface and an off-board network, wherein the ground-based proxy device is configured to access security policies to make an authorization determination of whether communication with the first server is allowed;

in response to the authorization determination indicating that the communication with the first server is allowed, receive second data from the first server via the ground-based proxy device; and concurrently with routing the first data, route the second data to the portable computing device via the wireless access point.

8. The aircraft of claim 7, wherein the NFS is configured to, based on a determination that communication with a destination address provided by the portable computing device is unauthorized for the portable computing device, send a non-routable address via the first network interface to the portable computing device.

9. The aircraft of claim 7, wherein the flight information computing device generates the aircraft flight information based on sensor data received from one or more aircraft sensors.

10. The aircraft of claim 7, further comprising:
a second wireless access point configured to communicate with a second portable computing device and receive, from the second portable computing device, a second request to communicate with a particular server of the one or more off-board servers; and
a passenger cabin server coupled to the second wireless access point, the passenger cabin server configured to send the second request to the particular server without use of the ground-based proxy device.

11. A method of aircraft communication comprising:
routing, at an on-board computing device of an aircraft, first data received via a second network interface from a flight deck information network to a portable computing device via a first network interface and a wireless access point, wherein the portable computing device has access to a flight information computing device of the aircraft, wherein the first data includes aircraft flight information generated by the flight information computing device, and wherein the second network interface is distinct from the first network interface;

sending, from the on-board computing device to a ground-based proxy device via a third network interface, a first request from the portable computing device to communicate with an off-board server, wherein the ground-based proxy device is configured to:
    determine, based on security policies, whether communication with the off-board server is authorized; and
    based on a determination that the communication with the off-board server is authorized, retrieve second data from the off-board server; and
    send the second data to the on-board computing device; and
concurrently with routing the first data, routing, via the on-board computing device, the second data via the first network interface and the wireless access point to the portable computing device.

12. The method of claim 11, further comprising:
receiving, at the on-board computing device via the wireless access point from the portable computing device, a routing request indicating a destination address; and
determining, based on routing information, whether the destination address satisfies a routing criterion.

13. The method of claim 12, further comprising:
selecting, at the on-board computing device, a routing address of a communication service based on determining that the destination address satisfies the routing criterion, wherein the routing address is selected from a configuration file; and
sending the routing address from the on-board computing device via the wireless access point to the portable computing device.

14. The method of claim 12, further comprising, based on determining at the on-board computing device that the destination address fails to satisfy the routing criterion, sending a non-routable address via the wireless access point to the portable computing device.

15. The method of claim 11, further comprising receiving, at the on-board computing device, encrypted data responsive to the first request.

16. The method of claim 15, further comprising, prior to routing the second data to the portable computing device, extracting the second data from the encrypted data.

17. A computer-readable storage device storing instructions that, when executed by a processor of an on-board computing device of an aircraft, cause the processor to perform operations comprising:
    routing first data received via a second network interface from a flight deck information network to a portable computing device via a first network interface and a wireless access point, wherein the portable computing device has access to a flight information computing device of the aircraft, wherein the first data includes aircraft flight information generated by the flight information computing device, and wherein the second network interface is distinct from the first network interface;
    sending, from a third network interface to a ground-based proxy server, a first request from the portable computing device to communicate with an off-board server, wherein the ground-based proxy server is configured to:
        determine, based on security policies, whether communication with the off-board server is authorized; and
        based on a determination that the communication with the off-board server is authorized, retrieve second data from the off-board server; and
        send the second data to the on-board computing device; and
    concurrently with routing the first data, routing the second data from the off-board server via the wireless access point to the portable computing device.

18. The computer-readable storage device of claim 17, wherein the operations further comprise:
    receiving, via the first network interface and the wireless access point from the portable computing device, a routing request indicating a destination address; and
    determining, based on routing information, whether the destination address satisfies a routing criterion.

19. The computer-readable storage device of claim 18, wherein the operations further comprise:
    selecting a routing address based on determining that the destination address satisfies the routing criterion; and
    sending the routing address via the wireless access point to the portable computing device.

20. The computer-readable storage device of claim 18, wherein the operations further comprise, based on determining that the destination address fails to satisfy the routing criterion, sending a non-routable address via the wireless access point to the portable computing device.

21. The computer-readable storage device of claim 17, wherein the operations further comprise receiving encrypted data responsive to the first request.

22. The computer-readable storage device of claim 21, wherein the operations further comprise, prior to routing the second data to the portable computing device, extracting the second data from the encrypted data.

\* \* \* \* \*